Sept. 27, 1927.
J. LEDWINKA
1,643,740
AUTOMOBILE BODY
Filed July 14, 1921
9 Sheets-Sheet 1
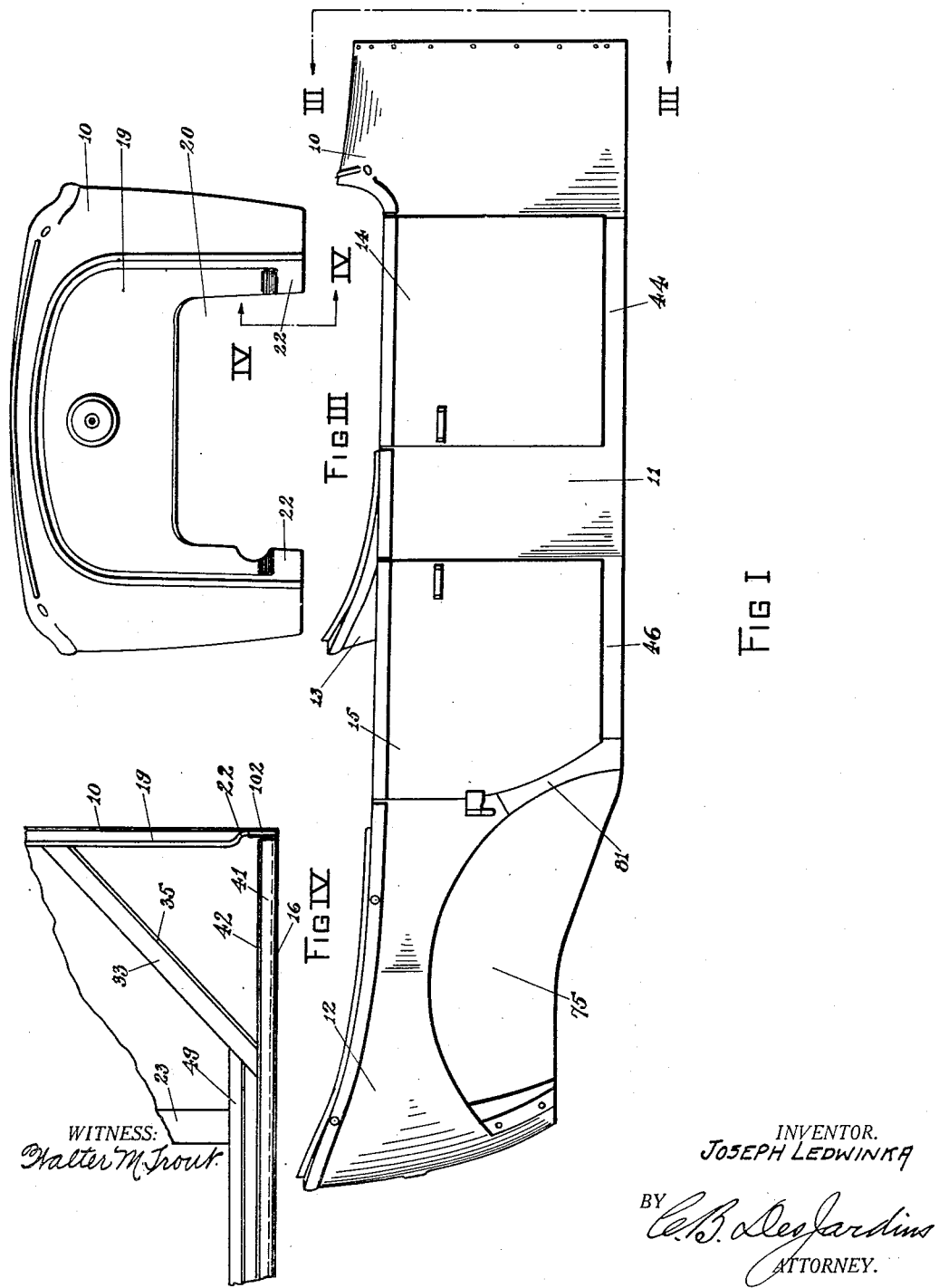
INVENTOR.
JOSEPH LEDWINKA
BY C. B. Desjardins
ATTORNEY.

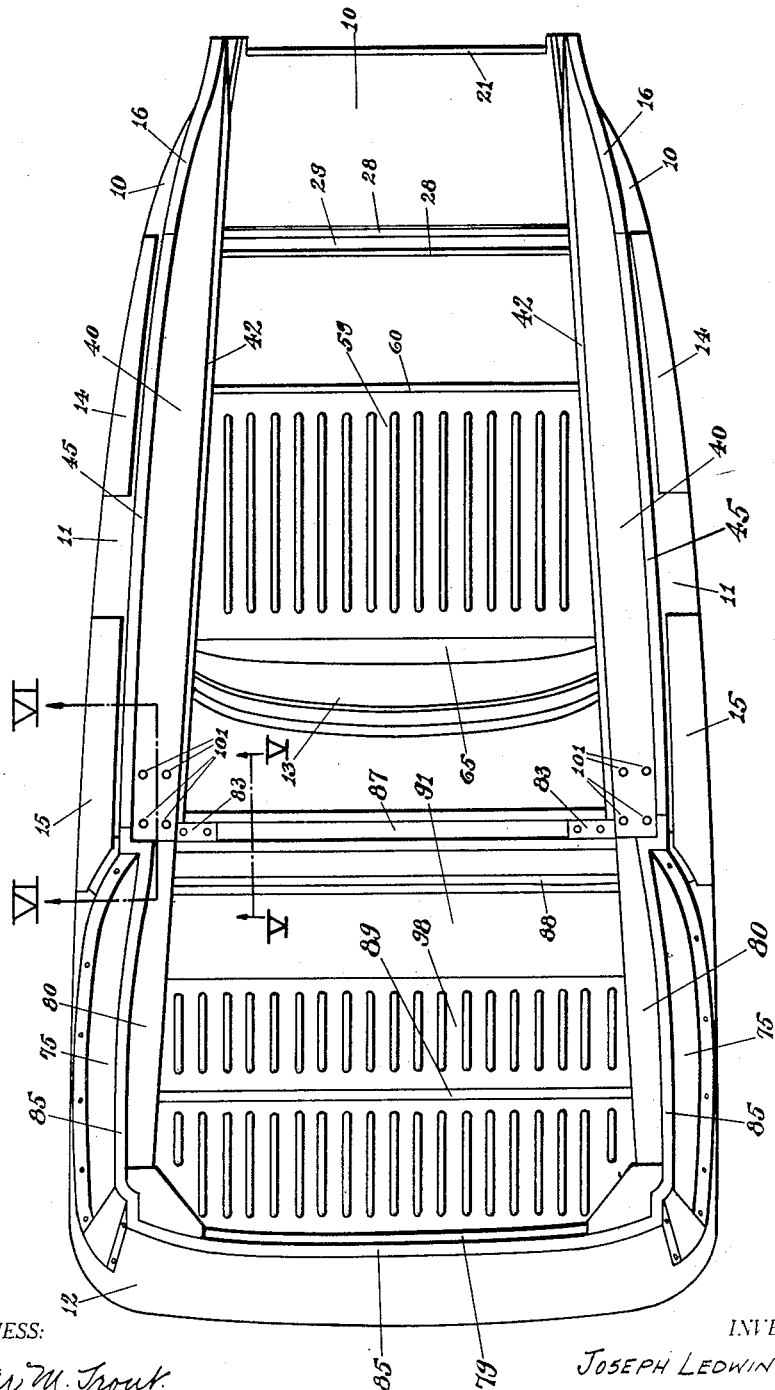

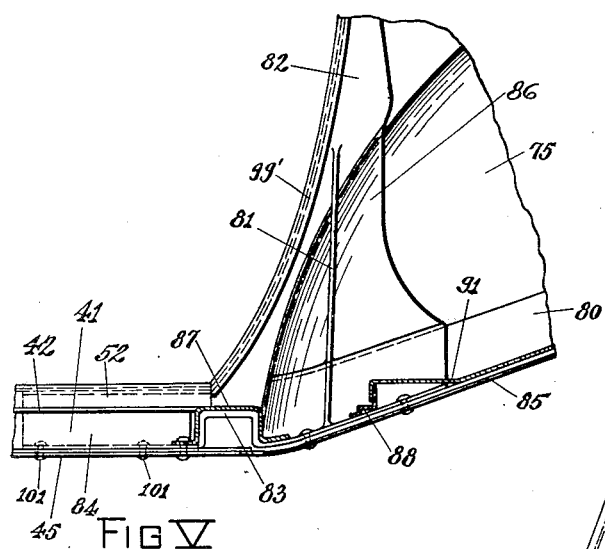
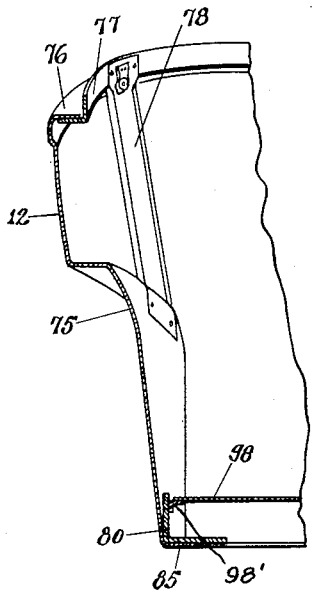
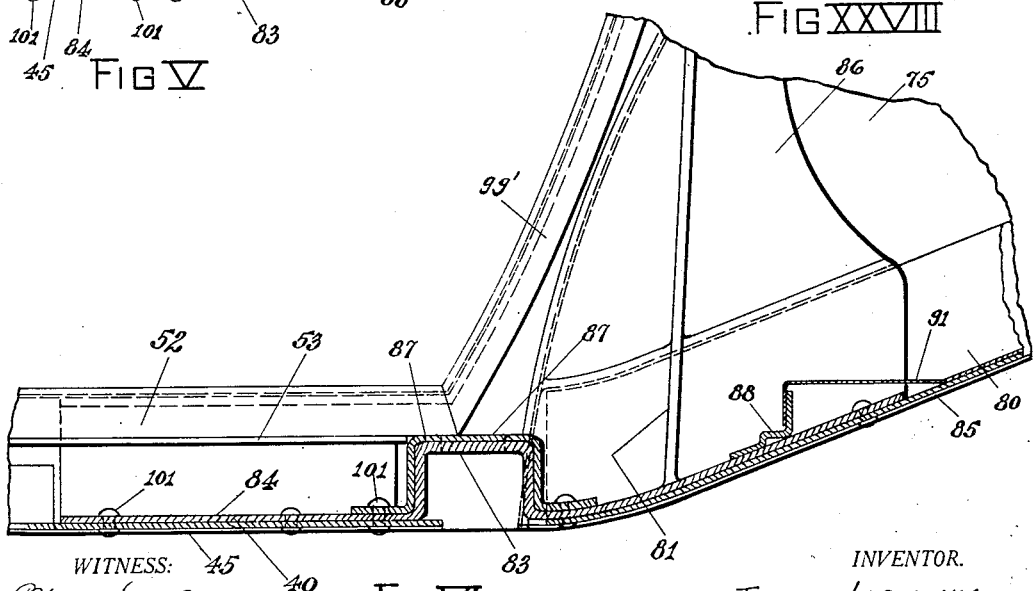

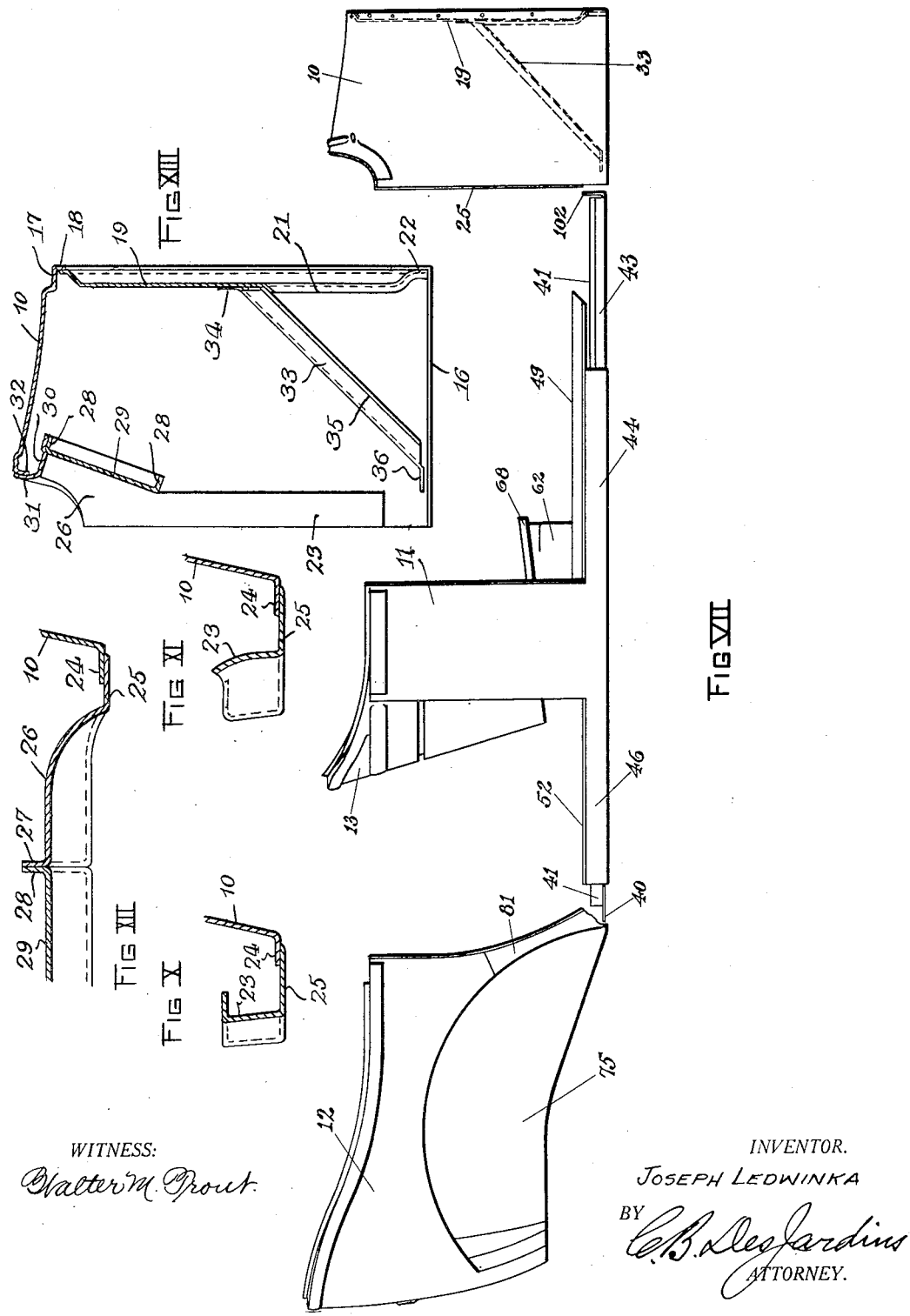

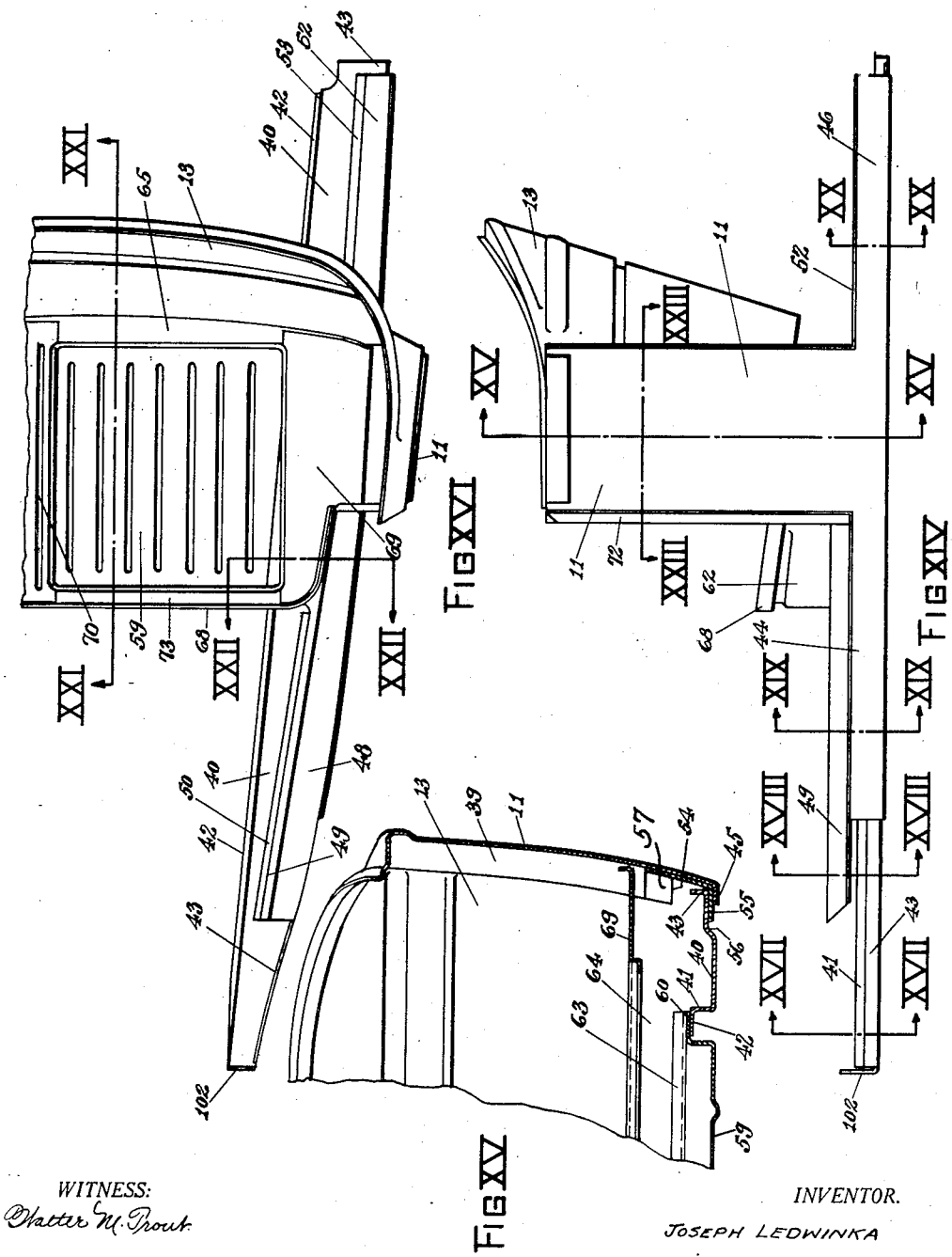

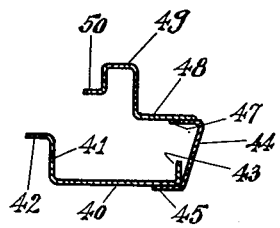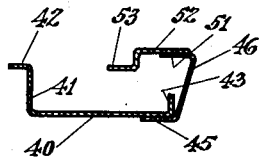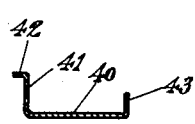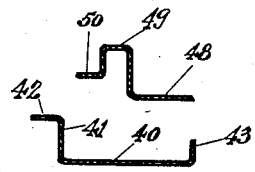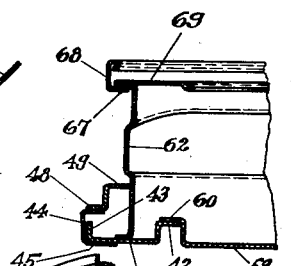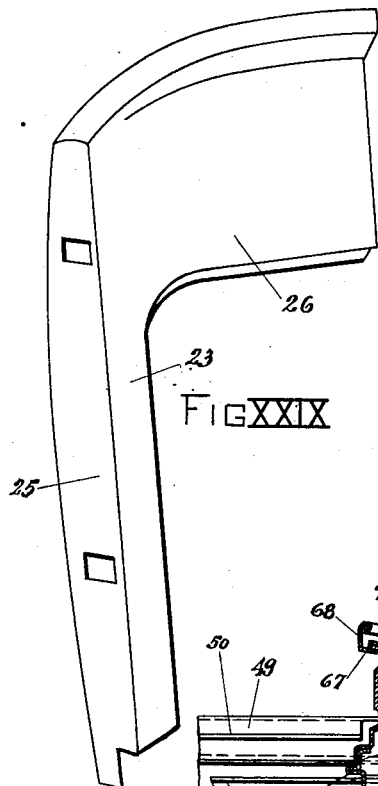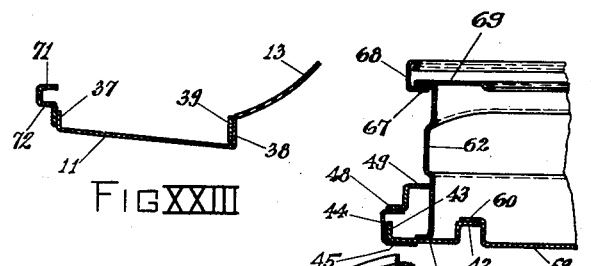

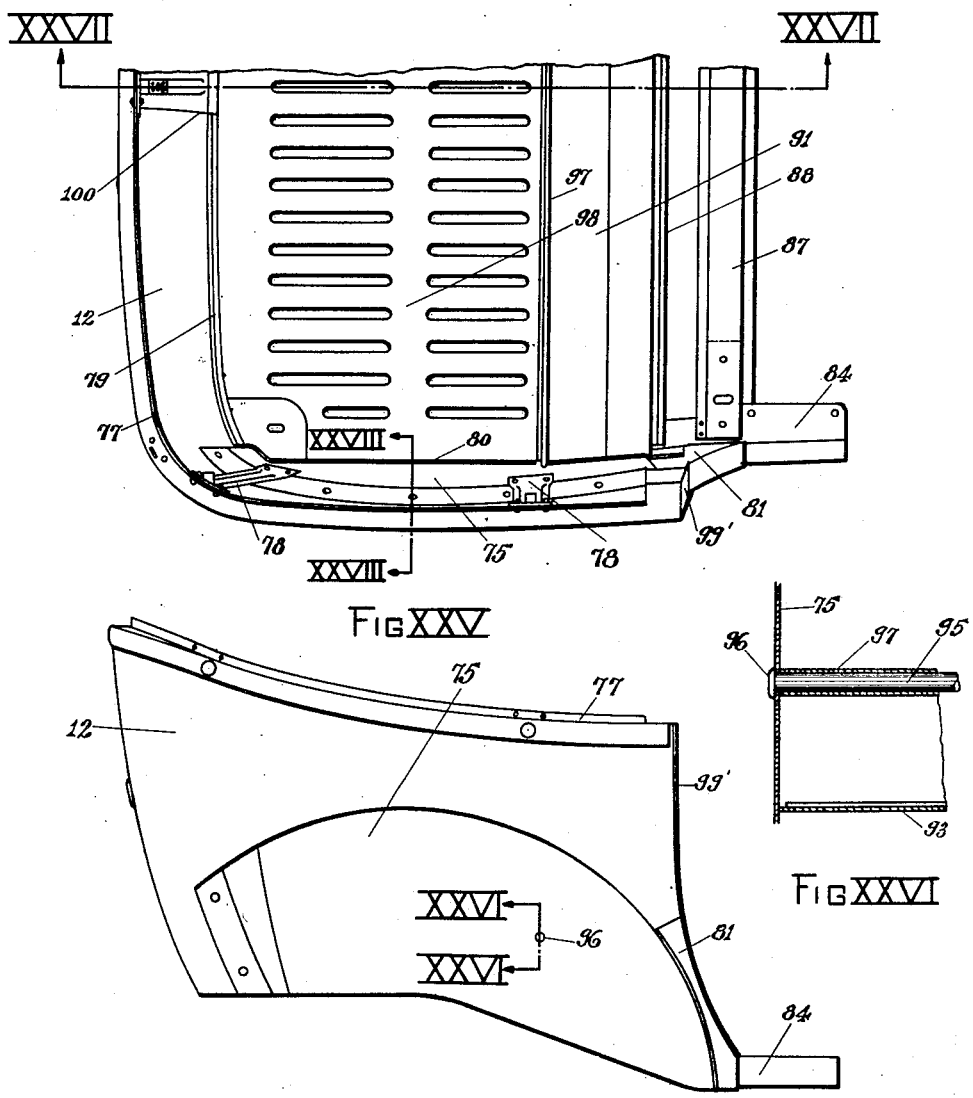

Sept. 27, 1927.  J. LEDWINKA  1,643,740
AUTOMOBILE BODY
Filed July 14, 1921  9 Sheets-Sheet 8
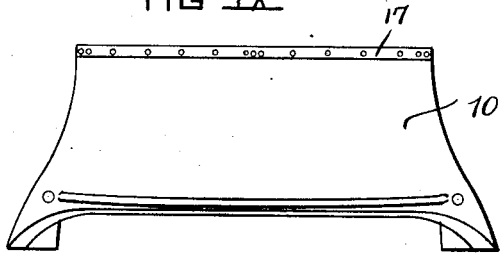
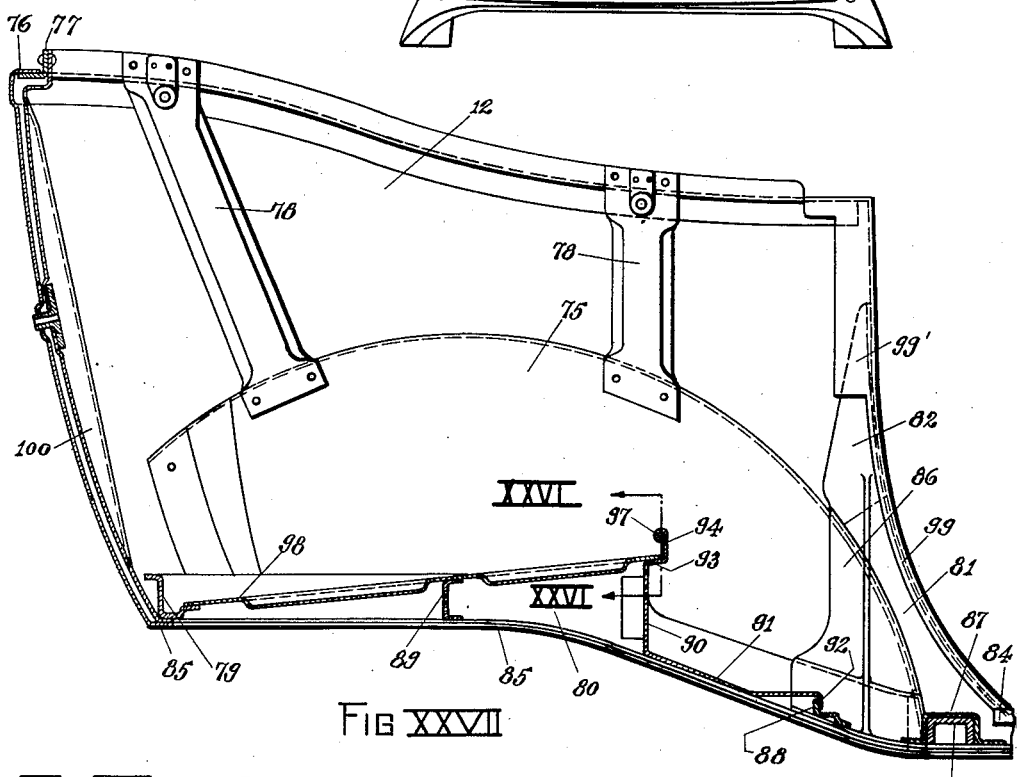
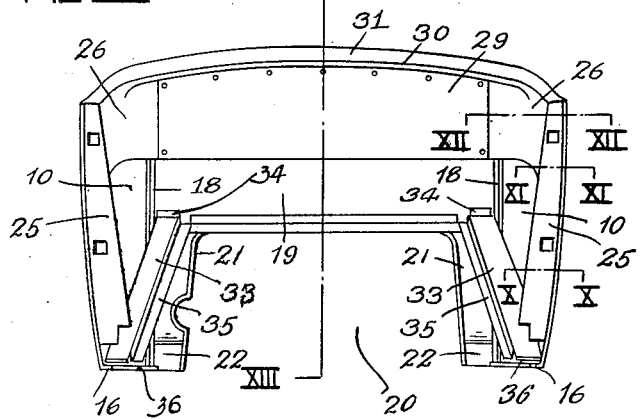
INVENTOR.
JOSEPH LEDWINKA
BY
ATTORNEY.

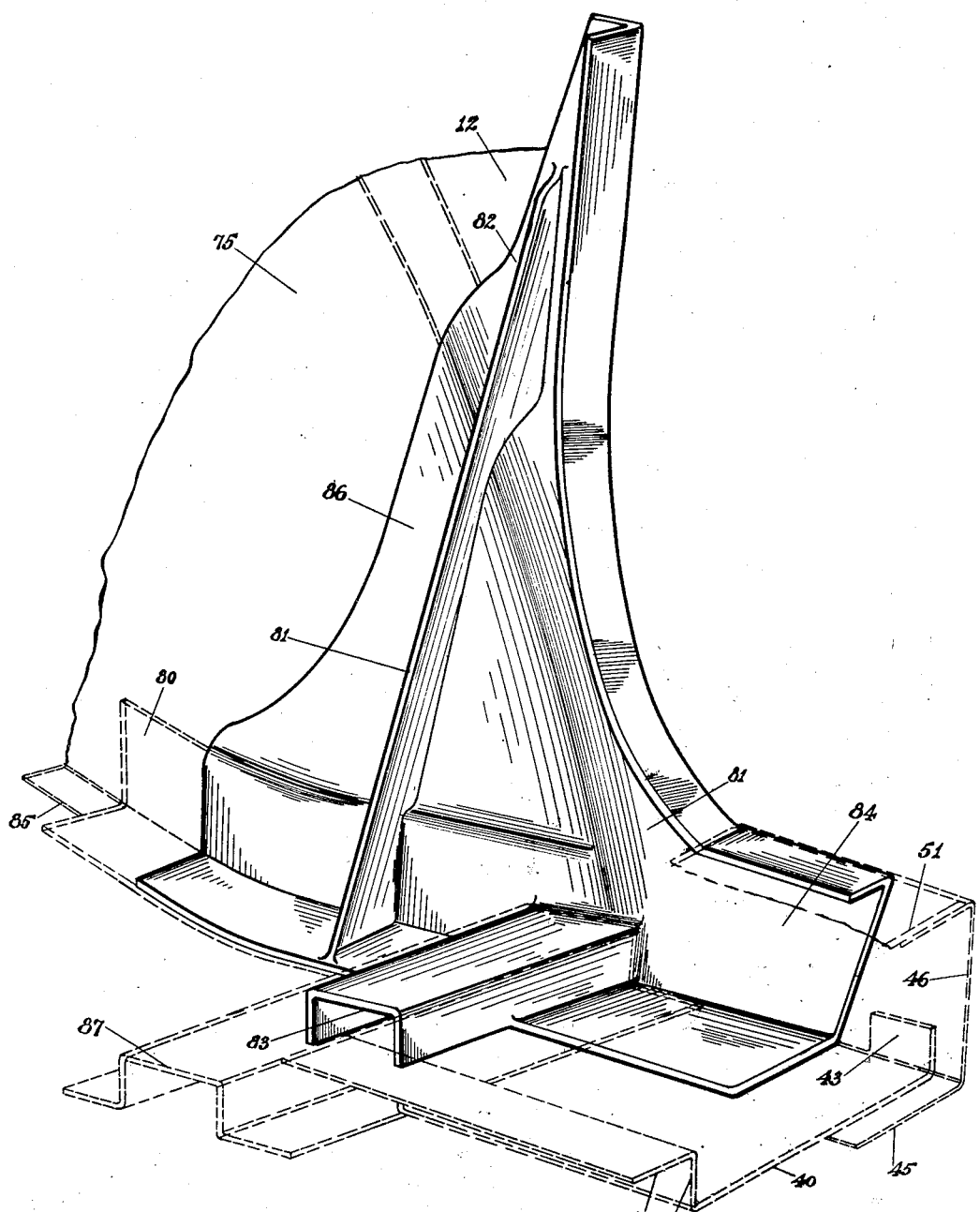

Patented Sept. 27, 1927.

1,643,740

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

AUTOMOBILE BODY.

Application filed July 14, 1921. Serial No. 484,674.

This invention relates to improvements in automobile bodies. This invention has to do more particularly with automobile bodies which are constructed entirely of metal and particularly with that type of all metal body which is constructed by the assembly of sheet metal stampings which are suitably fabricated so as to give the desired shape and contour to the exterior of the body.

One of the objects of my invention is to provide a sheet metal body for automobiles, which is particularly simple in construction and durable and efficient in operation and use.

Another object of my invention is to provide an all metal body for automobiles which is so constructed that it lends itself readily to simple, cheap, and efficient methods of manufacture and assembly.

Another object of my invention is to provide a metal body for automobiles which is constructed of a plurality of main units so formed that they may be joined together to form a complete body by a very few simple operations so that, if desired, the body units may be shipped to the automobile manufacturer and assembled by the latter to form a complete body at a very slight additional expense.

Another object of my invention is to construct a plurality of separately assembled body units, one of them including body sills to which the other units are applied and secured.

Another object of my invention is to provide an automobile body having improved means for supporting and carrying the instrument board from the cowl.

Another object of my invention is to provide an automobile body having an improved tonneau construction in which the heel board for the rear seat is secured to the tonneau in a particularly strong and durable manner.

Another object of my invention is to provide an automobile body having a front seat unit carrying the body sills to which cowl and tonneau units are connected to form the complete body.

Further objects, and objects relating to economies of material and details of construction, will appear more definitely from the detailed description to follow. I accomplish the objects of my invention, in one instance, by the devices and means described in the following specification. My invention is clearly defined and pointed out in the appended claims. A structure constituting a preferred embodiment of my invention is illustrated in the accompanying drawing, forming a part of this specification, in which:

Fig. I is a view in side elevation of a body embodying my invention.

Fig. II is a bottom plan view of the body.

Fig. III is a view of the front end of the body in elevation.

Fig. IV is a fragmentary view in side elevation of a portion of the front end of the body taken substantially on the line IV—IV of Fig. III.

Fig. V is a fragmentary view, partly in section, taken substantially on the line V—V of Fig. II and showing the connection of one forward corner of the tonneau unit with one of the body sills.

Fig. VI is a somewhat similar view, on an enlarged scale, taken substantially on the line VI—VI of Fig. II.

Fig. VII is a view in side elevation of a structure employing three unit assemblies going to make up the body, showing these units slightly separated from each other and disconnected, prior to their connection together to form the complete body.

Fig. VIII is a view in elevation of the cowl unit looking from the rear end thereof toward the front.

Fig. IX is a top plan view of the cowl unit.

Fig. X is a sectional view through the A door post of the cowl unit, taken on the line X—X of Fig. VIII.

Fig. XI is a similar view taken on the line XI—XI of Fig. VIII.

Fig. XII is a similar view taken on the line XII—XII of Fig. VIII and showing the construction for supporting the instrument board.

Fig. XIII is a vertical, sectional view through the cowl unit, taken on the line XIII—XIII of Fig. VIII.

Fig. XIV is a view of the front seat unit in side elevation.

Fig. XV is a vertical sectional view through one side of the front seat unit, taken on the line XV—XV of Fig. XIV.

Fig. XVI is a top plan view of one half of the front seat unit.

Fig. XVII is a sectional view through one of the body sills, taken on the line XVII—XVII of Fig. XIV.

Fig. XVIII is a sectional view taken on the line XVIII—XVIII of Fig. XIV.

Fig. XIX is a sectional view taken on the line XIX—XIX of Fig. XIV.

Fig. XX is a sectional view taken on the line XX—XX of Fig. XIV.

Fig. XXI is a vertical sectional view through the front seat unit taken on the line XXI—XXI of Fig. XVI.

Fig. XXII is a sectional view through the front seat support and heel-board taken on the line XXII—XXII of Fig. XVI.

Fig. XXIII is a sectional view through one of the side panels taken on the line XXIII—XXIII of Fig. XIV.

Fig. XXIV is a view in side elevation of the tonneau unit.

Fig. XXV is a top plan view of one half of the tonneau unit.

Fig. XXVI is a detail, sectional view on the line XXVI—XXVI of Figs. XXIV and XXVII.

Fig. XXVII is a vertical, sectional view through the tonneau unit taken on the line XXVII—XXVII of Fig. XXV.

Fig. XXVIII is a sectional view through the side of the tonneau unit taken on the line XXVIII—XXVIII of Fig. XXV.

Fig. XXIX is a perspective view of one of the A door posts, and

Fig. XXX is a perspective view of one of the reinforcing brackets at the forward corners of the tonneau.

Similar reference numerals refer to similar parts throughout the several views, and the sectional views are taken looking in the direction of the arrows at the ends of the section lines.

In general, my invention consists in the construction of a metallic body for automobiles by the formation of unit assemblies which are joined together by very simple connections so as to form the complete body. These unit assemblies, may, in general, consist of a cowl unit, a front seat unit and a tonneau unit and these units may well be of such construction that a decided economy may be attained by shipping the individual units to the automobile manufacturer and leaving the final assembling operations to be carried on at the plant of the latter. This is possible because of the very simple nature of the final assembling operation necessary to join these units together to form the complete body. Even if the final assembling operations are carried out by the body manufacturer, a decided economy results from the simplicity of these final assembling operations.

The cowl unit may include the cowl panel, which is shaped to the contour of that part of the body in front of the front doors. The A door posts may well be attached to this cowl panel so as to form part of the cowl unit, and I have also found it desirable to provide toe board supports as a part of the cowl unit. According to another feature of my invention, I propose to fasten the "A" door posts to the rear vertical edges of the cowl panel and to so fashion the upper portions of these door posts that they provide means for supporting the instrument board which is carried at the upper rear part of the cowl unit.

The central unit, which I term the front seat unit, may comprise the side panels, which form the side walls of the body between and beneath the doors, the front seat panel, which is curved to form the sides and back of the front seat, and also the supporting structure upon which the cushion for the front seat is supported. One of the unit assemblies includes body sill members, which form the back-bone, as it were, of the body and extend longitudinally of the body from front to rear. In the present embodiment, these body sills, in the completed body, extend from the forward corners of the tonneau, that is, the rear corners of the rear door openings, to the forward end of the body. The other unit assemblies are designed to be applied and secured to these body sill members to form the completed body. In the particular arrangement shown, but to which my invention is not to be limited or restricted, the body sills are carried by and form a part of the front seat unit and may well be integrally secured to the panels forming the side panels of the body. In practice, I may and do, in some cases, construct the central or front seat unit shown in Figs. XIV to XVII as two separate sub-assembly units comprising, on the one hand, a substantially flat base unit embodying only the sills and an appropriate cross connecting member or members and on the other hand, the remaining elements of the complete central or front seat shown in these figures. Where such separate base unit is employed, it is slid longitudinally into its associated unit from the rear, and rigidly joined thereto as by welding, or riveting to thereby form the complete central unit shown in these Figures XIV to XVI.

The tonneau unit comprises the rear portion of the body, and, as in the embodiment which I have illustrated, this unit may include the tonneau panel shaped to form the sides and back of the rear seat, a tonneau unit frame which strengthens and reinforces the lower portion of the tonneau unit, reinforcing brackets which form the D door posts, and a supporting structure for carrying the rear seat cushion.

In assembling the complete body, all that is necessary is to connect the three units, just described, together. The front ends of the body sills, when carried by the front seat unit, extend into the cowl unit and are joined thereto in a rigid manner by riveting or welding at appropriate points. The rear ends of the body sills are connected to the forward corners of the tonneau unit by riveting or welding and thus the three units are joined together and, when the doors are hung on the appropriate door posts, in this case the A and D posts, the body is complete.

In Fig. I, I have shown, in side elevation, a body which constitutes one embodiment of my invention. This body has the cowl, 10, the side panels, 11, forming the side walls of the body between the front and rear door openings, the tonneau, 12, the front seat, 13, and the front and rear doors, 14 and 15, respectively.

The cowl unit is illustrated in detail, in Figs. VIII to XIII. This cowl unit comprises the cowl panel, 10, which is, in general, of arch shape and curved so to have the desired contour to form that part of the body in front of the front door openings. The lower side edges of the cowl panel are provided with the horizontal, inwardly-extending flanges, 16, which, in the completed body, underlie the body sills. The forward edge portion of the cowl panel is provided with a marginal depression, 17, as shown in Fig. XIII. This depression provides a seat at the forward edge of the cowl unit for the engine hood. The cowl panel is reinforced and strengthened by the shroud pan, 19, which forms a front wall for the cowl unit and the edges of which may be rigidly secured to the forward edges of the cowl panel, 10. For instance, the cowl panel, 10, may be flanged inwardly, at 18, and the edges of the shroud pan, 19, secured by welding, or otherwise, to this flange, 18. In order to give greater strength, the body portion of the shroud pan, 19, may be pressed out of the plane of the edges thereof, secured to the flange, 18. An opening, 20 may be formed in the lower part of the shroud pan, 19, and the metal around the edges of this opening may be flanged inwardly at 21, still further strengthening and reinforcing the shroud pan and cowl unit. The lower side portions of the shroud pan may be pressed into the plane of the flange, 18, as at 22, so as to form a convenient surface for connecting the forward ends of the body sills, as will be described in further detail hereinafter.

The rear side portions of the cowl panel, 10, are provided with the inwardly-extending flanges, 24, to which flanges the A door posts are rigidly connected by welding or other suitable means. These A door posts, 23, may be, in their lower portions, of channel cross section, as shown in Fig. X, and the outer wall, 25, of the member, 23, overlaps and is welded to flange 24, of the cowl panel. The upper portions of these door posts, 23, change gradually from the cross section shown in Fig. X to that shown in Fig. XI, and from the cross section shown in Fig. XI to that shown in Fig. XII, in which there is a portion, 26, curved and extending inwardly of the body from the wall, 25, of the door post. The part, 26, is provided with a forwardly extending flange, 27, to which the marginal flange, 28, of the instrument board, 29, is secured. One of these A door posts is shown in perspective in Fig. XXIX and it will be seen that the upper portion of this door post is provided with the extension, 26, suitably curved and extending inwardly of the cowl unit so as to form a support for the instrument board. These door posts are provided with hinge boxes in accordance with the usual practice. In this embodiment of my invention, I have provided an especially attractive finish for the cowl unit, which, as shown in Fig. XIII, comprises an inturned flange, 32, on the rear upper edge of the cowl panel, 10. The upper portion, 26, of the door post is provided with a flange which overlies and is rigidly secured to this flange, 32. Between the parts, 26, of the respective door posts, there is provided a garnish rail or piece, 30, which has a flange, 31, extending over the inwardly directed flange, 32, of the cowl panel, and rigidly secured thereto. The inwardly extending portion of this garnish rail is secured to the marginal flange, 28, of the instrument board. The joints between the cowl panel, door posts and garnish rail are welded together in any manner so as to give a smooth and finished appearance and so as to make the parts substantially integral with each other.

In the cowl unit which I have described, I also provide toe board supports which are rigidly secured to the inner side walls of the cowl panel, 10, in inclined position. These toe board supports, 33, each have a ledge, 35, at their inner edges, on which the ends of the toe boards may rest. The upper ends of the toe board supports are provided with feet, 34, rigidly secured to the shroud pan 19, while the lower ends of these members are provided with horizontally extending feet, 36, which extend above but are spaced from the flanges, 16, and afford means for the connection of body sills to the cowl unit in the manner to be described later.

The front seat unit is illustrated in Figs. XIV to XXIII of the drawings, and, in this embodiment of my invention, the front seat unit includes the side panels, the front seat panel, the structure for supporting the front seat cushion, the thresholds for the front and rear door openings and the body sills. The side panels, 11, are provided with the vertical inwardly-extending flanges, 37 and 38, which make this portion of the panel substantially channel-shaped in cross section, as shown in Fig. XXIII. The flanges, 38, are secured rigidly and integrally to the forward vertical edges of the front seat panel, 13, which is curved to form the sides and back of the front seat, so that this seat panel becomes substantially a part of the side panels. A reinforcing strip, 39, may be applied to each of the flanges, 38, to reinforce the construction at these points. The portions, 44 and 46, extend laterally from the side panel, 11, beneath the front and rear door openings, as shown in Figs. I, VII and XIV. The lower edges of the side panels, 11, including the extensions, 44 and 46, are turned inwardly, forming the horizontal flanges, 45, which lie under the body sills, 40, at the respective sides of the body. The body sills are secured to these flanges rigidly by welding or otherwise.

There are a pair of body sills, 40, one at each side of the body and secured to the inturned horizontal flanges, 45, of the side panels, as described. Each body sill, 40, has an upwardly-extending flange, 41, at its inner edge, which flange terminates in a lateral ledge, 42, for supporting the floor boards, seat pan, or similar parts. This flange, 41, forms, with the body portion, 40, of the sill, a girder portion which extends longitudinally straight from the front end of the body to the tonneau. In most bodies, as in the particular embodiment shown here, the lower edge of the body, as defined by the line of juncture between the flange, 45, and the side panel, is slightly curved longitudinally and the body sill, 40, in this embodiment is provided with an upwardly-extending flange, 43, at its outer edge which is also slightly curved longitudinally to conform to the curvature of the lower edge of the body, so that the outer edge of the portion, 40, of the body sill, is always disposed substantially in line with the outer edge of the flange, 45. The flange, 43, on the body sill, serves to reinforce the sill at its point of connection with the side panel while the flange, 41, forms a longitudinally straight girder portion at the inner edge of the body sill. This feature of my invention is disclosed and claimed in U. S. Letters Patent, No. 1,431,314, granted October 10, 1922; on my application, Serial No. 436,630, filed Jan. 11th, 1921.

The extension, 44, of the side panel, has an inwardly extending flange, 47, at its upper edge, to which is attached a suitable strip to form the threshold for the front door. This threshold strip may take the form of a channel member, 49, having a flange, 48, attached rigidly and integrally to the flange, 47, and this channel member may also be provided with an inwardly-extending flange, 50, which forms a ledge or seat on which the ends of the floor boards may rest. Similarly, the extension, 46, of the side panel is provided with the flange, 51, beneath the rear door opening, to which the threshold strip, 52, is rigidly secured. As shown in Fig. XX, it may be desirable to provide the strip, 52, with a seat, 53, for supporting the ends of the floor boards, which, in this case, may also rest on the ledges, 42, of the body sills.

I also provide reinforcing members, 54, for reinforcing the lower portions of the side panels, 11. One of these members is shown in Figs. XV and XXI and comprises a stamping fitting within the lower portion of the side panel and having a laterally extending flange, 55, at its lower edge, which lies between the flange, 45, of the side panel, and the body sill at this point, the body sill having a seat, 56, pressed therein at this point to accommodate the flange, 55. The reinforcing member, 54, also has vertical flanges, 57, which are positioned against the inner sides of and reinforce the lower portions of the vertical flanges, 37 and 38, of the side panel. This reinforcing member, 54, also has a channel-shaped lateral extension, 58, which lies within and reinforces the extension, 46, of the side panel, and a similar channel-shaped extension lying within and reinforcing the extension, 44, of the side panel.

The seat pan, 59, for the front seat, is provided with a marginal flange, 60, which, at the sides of the seat pan, rests on and is rigidly secured by welding, or otherwise, to the ledges, 42, of the body sills, 40. In order to strengthen this seat pan, the body portion thereof may be pressed out of the plane of the flange, 60, and it may also be corrugated to further reinforce it. A Z-shaped cross member, 61, rests on that portion of the flange, 60, at the front edge of the seat pan, and is rigidly secured thereto and a flange at the lower edge of the heel board, 62, is also connected to this cross member, 61. The heel board, 62, has its ends curved rearwardly, as shown in Figs. XIV and XVI, and is also provided with a laterally extending flange, 66, at its upper edge. An angle cross member, 63, rests on the rear edge flange, 60, of the seat pan and the lower edge of the partition, 64, rests on this cross member, 63, such parts being rigidly secured together by welding or otherwise. A flange, 65, is formed on the upper edge of the partition, 64, which flange slopes rearwardly so as to have substantially the same inclination as the front seat and constitute the rear support therefor. The rear edge of this flange, 65, is shaped so as to fit within the lower part of the front seat panel, 13, and a flange, 65', formed at the lower edge of the seat panel lies under and is secured to the flange, 65, of the partition. A front support, 73, extends across from one side of the front seat to the other and rests on and is secured to the flange, 66, of the heel board. Side seat supports, 69, are supported by and secured to the flanges, 65 and 66, respectively, being welded thereto. The cross member, 70, may be provided, extending from the flange, 65, to the front support, 73, midway between the side seat supports, 69. A cushion retainer, 68, of angular cross section, is provided at the upper edge of the heel board and is fastened to the heel board by welding the flange, 67, of the cushion retainer, to the flange, 66, of the heel board. The seat pan, 59, together with the side panels, 11, heel board, 62, and partition, 64, may form a tool box or storage compartment beneath the front seat and also form a supporting structure for the front seat cushion.

The tonneau unit may comprise, in general, the tonneau panel curved to form the sides and back of the rear seat, a tonneau frame, for reinforcing this tonneau panel and for supporting the rear seat, and also, in some cases, reinforcing members for the forward edges of the tonneau panel, forming D door posts. The tonneau unit is shown in Figs. XXIV to XXVIII of the drawings, and includes the tonneau panel, 12, curved to form the sides and back of the rear seat. The side portions of this tonneau panel, 12, have the inwardly extending depressions, 75, formed therein, providing wheel housings. The upper edge of the tonneau panel is provided with an inturned flange, 76, to which a garnish rail, 77, of angular cross section may be secured. I find it desirable to provide the brace members, 78, secured at the top to this garnish rail and, at the bottom, to the wheel housing, to strengthen and reinforce the tonneau unit. The frame for reinforcing the lower portion of the tonneau panel comprises the rear tonneau sill, 79, and the tonneau side sills, 80, which are rigidly connected together to make a substantially integral frame unit. At the forward lower corners of the tonneau unit, I provide reinforcing members, 81, each of which members consists of the vertically extending portion, 82, which is applied to the vertical forward edge of the tonneau panel, the transversely extending portion, 83, which is channel-shaped in cross section and extends inwardly of the body, and the longitudinally and forwardly extending portion, 84, which is also channel-shaped in cross section. This reinforcing member may very well be a casting and serves the double function of reinforcing the lower forward portions of the tonneau panel and connecting the tonneau unit to the body sills. A flange, 85, is formed at the lower edge of the tonneau panel and extends laterally therefrom, lying under and being integrally secured by welding or otherwise to the tonneau sills, 79 and 80. The reinforcing member, 81, has an inwardly curved part, 86, conforming in curvature to the inner face of the wheel housing, 75. A channel-shaped cross member, 87, connects the inwardly extending portions, 83, of the reinforcing members, 81, at the lower forward corners of the tonneau unit. Another cross member, 88, also extends between the reinforcing members, 81, a short distance back of the cross member, 87, the cross member, 88, having a ledge in line with the top of the cross member, 87, so that the two together serve to support the floor boards. The tonneau side sills, 80, are also connected by a channel-shaped cross member, 89, which helps to support the seat pan. A stamping is provided having a vertical portion, 90, forming the rear heel board and an inclined portion, 91, which forms a part of the tonneau floor. The latter portion is secured to the cross member, 88, by a flange, 92. The stamping, above the vertical portion, 90, has a laterally extending flange, 93, forming a seat for the forward edge of the seat pan and an upwardly extending flange, 94, forming a retainer for the rear seat cushion. The upper edge of this flange, 94, is rolled into a hollow bead, 97, through which the rod, 95, extends. The ends of the rod, 95, pass through holes in the side walls, 75, of the wheel housings and are upset, as at 96, so as to hold the rod in place. This forms a very strong construction for holding the heel board in place and it may be supplemented by welding these parts to the tonneau panel. The seat pan, 98, which may be corrugated for strength, is transversely supported on and rigidly secured to the tonneau rear sill, 79, cross member, 89, and the flange, 93, of the heel board. The said edges of the seat pan 98 are supported by and secured to the supporting members 98' as is most clearly shown in Fig. XXVIII.

These members 98' are of angle section, the angles of which present inwardly and downwardly, and are secured to the inner faces of the tonneau side sills 80, such that they present rearwardly and downwardly inclined supporting flanges for the seat pan 98. The forward vertical edges of the tonneau panel are flanged over the reinforcing members, 81, as at 99, and suitable means are provided for hinging the doors thereto. The reinforcing members, 81, and particularly the vertical portions, 82, thereof, constitute the D door posts. The rear part of the tonneau unit is reinforced by the vertically extending brace, 100, which also provides means for supporting a tire carrier bracket.

In the manufacture of these bodies, the unit assemblies are first manufactured and the body is completed by assembling and connecting the unit assemblies together.

This method of manufacture has very decided economic advantages, one of these advantages being that the preliminary steps of manufacture in the formation of these units involves work on smaller parts and units than has been the case heretofore, with the result that the work can be performed more quickly and efficiently. For instance, the cowl unit is formed by attaching the shroud pan, 19, the door posts, 25, garnish rail, 30, and toe board supports, 33, to the cowl panel, 10. When these various members have been assembled and welded together, the cowl unit is complete and ready for assembly in the body. Similarly the front seat unit may be made by assembling the side panels, front seat panel, body sills, seat pan, heel board, partition, seat supports and threshold strips in their proper location with reference to each other and rigidly securing these parts together by welding or otherwise to form the complete unit. Similarly the tonneau unit may be formed by assembling the tonneau sills, 79 and 80, reinforcing members, 81, cross members, 89, 88, and 87, heel board, 90, rod, 95, and seat pan, 98, in their proper position with reference to the tonneau panel, 12, and then rigidly and integrally securing such parts in position by riveting, welding, or otherwise. This forms a complete tonneau unit ready for attachment to the other units to form the complete body.

It is to be noted that each of the three units which we have described is considerably smaller than the complete body. Heretofore, it has been customary to assemble the parts and stampings in a body assembling jig or fixture in which the various parts and stampings were welded and rigidly secured together to form the complete body. This assembling operation was rather difficult and expensive and necessitated the use of considerable floor space. According to my present invention, I provide for the manufacture of these bodies, in units, and these units can be manufactured in much smaller jigs with less costly operations. The final assembling operation by which the units are connected together is relatively cheap and simple. Furthermore, the various units may be manufactured without reference to each other, so that, for example, the factory may produce a considerable quantity of cowl units, front seat units and tonneau units separately which can be carried in stock and drawn from the finished stores as required and assembled into finished bodies very quickly and cheaply.

In Fig. VII I have shown three units in position to be assembled to form the complete body. The cowl unit is mounted on the forward ends of the body sills, 40, so that the flanges, 16, of the cowl unit, lie underneath the body sills, 40, and the upwardly extending flanges, 102, at the forward ends of the body sills, lie against the portions, 22, of the shroud pan, 19. The cowl unit and front seat unit are rigidly connected together by welding or riveting the flanges, 102, to the portions, 22, of the shroud pan of the cowl unit and by welding or otherwise integrally securing the feet, 36, of the toe-board supports to the body sills. The lower ends of the door posts, 23, are also welded or otherwise rigidly secured to the threshold strips, 48, of the front seat unit and the flanges, 16, of the cowl unit are rigidly secured by welding or otherwise to the body sills, 40. By these few simple and relatively inexpensive operations, the cowl unit and front seat unit are relatively connected to form the complete body. In order to connect the tonneau unit and front seat unit together, the rear ends of the body sills, 40, and the forwardly extending portions, 84, of the reinforcing members, 81, of the tonneau unit, are brought into overlapping engagement with each other so that the portions, 84, rest upon the body sills, 40, and these parts are rigidly secured together, for instance, by means of the rivets, 101. The threshold strips, 52, at the lower edge of the rear door openings, may also be welded to the finishing strip, 99', applied to the forward edges of the tonneau panel. These simple and relatively inexpensive operations serve to connect the front seat unit and the tonneau unit together. The doors can now be hung on the door posts and the body is complete except for painting and similar finishing operations.

I am aware that the embodiment of my invention, which I have illustrated and described in this specification, may be changed considerably without departing from the spirit of my invention, and, therefore, I am not to be restricted to the particular embodiment illustrated, but claim my invention broadly, as indicated by the appended claims.

Having thus described my invention, what I claim as new and desire to secure by Letters Patent is:—

1. A unit assembly construction for automobile bodies comprising an endmost unitary sub-assembly terminating substantially in the vertical transverse plane of the endmost door posts, and embodying endmost door post structures, and an adjoining unit joined thereto in said plane through complemental joint parts on the respective units, said joint including one of said door post structures.

2. A vehicle body construction comprising a cowl unit embodying a cowl panel and front door posts connected therewith, and an independently assembled adjoining unit comprising sill members joined to said cowl unit in substantially the plane of said door posts and having a frontal extension overlapping said cowl panel within the body of the unit.

3. A unit assembly construction for vehicle bodies comprising a cowl unit embodying a shroud pan at its fore end and front door posts at its rear end, an adjoining unit embodying a body side sill the main body of which is joined with the cowl unit through the posts in the plane of its rear end, and is provided with a fore end extension extending to and connected with the shroud pan.

4. A unit assembly construction for vehicle bodies comprising an independently assembled cowl unit, embodying a shroud pan at the fore end of said unit and front door posts at the rear end of said unit each having a base portion separated by an open space from the bottom plane of the cowl unit, an independently assembled unit embodying a body side sill having a threshold portion adapted to be joined to the base portion of its adjacent post, and a fore extension adapted to be telescoped beneath the base portion of said post and within the cowl unit to contact with the shroud pan and be connected therewith.

5. A unit assembly construction for pressed metal vehicle bodies comprising an independently assembled cowl unit having longitudinally extending ways in its lower marginal portions extending from its fore end to its rear end including door post structures at its rear side edges, and an independently assembled body unit embodying a body side sill having a threshold portion adapted to be joined to said cowl unit through its adjacent door post structure at the mouth of a corresponding way, and a fore sill extending from said threshold portion adapted to be entered in said way and projected into contact with and connected to the fore end of said cowl unit.

6. An automobile body construction comprising independently assembled endmost and adjoining units, each of said units embodying a longitudinally extending side sill, and a reinforcing bracket secured to one of said units, said reinforcing bracket having an expansive base portion for overlapping engagement with the side sills of both of said units.

7. A pressed metal vehicle body comprising a tonneau unit embodying a tonneau side sill and a bracket secured to the forward portion of said sill and having a widened base serving as a foundation for a rear door post, an extension formed integrally on said bracket, and an adjoining unit embodying a body side sill terminating at said bracket and connected with said integral extension thereof.

8. A unit assembly construction comprising a tonneau unit embodying a tonneau side sill and a bracket secured to the forward portion of said sill and having a widened base serving as a foundation for a rear door post, a fore extension from said bracket formed integrally therewith, and an adjoining side unit embodying a body side sill of hollow cross section terminating at said bracket and joined thereto by telescopic engagement with said fore extension.

9. A unit assembly construction for pressed metal vehicle bodies comprising an endmost unit embodying a side sill and a bracket secured thereto and having an inwardly extending base flange, and an independently assembled adjoining unit embodying a body side sill terminating upon the base flange of said bracket and through interconnection of the terminal end of which with said base flange the body side unit is joined to the endmost unit.

10. A sheet metal body for automobiles comprising an independently assembled unit including a longitudinally-extending body sill; and an independently assembled tonneau unit including a tonneau panel curved to form the sides and back of a rear seat, a tonneau frame rigidly connected to the lower portions of said tonneau panel, and a pair of reinforcing brackets rigidly connected at the forward corners of said tonneau frame and to the rear ends of said body sills to join the tonneau unit to the first-named unit.

11. A unit assembly construction for automobile bodies comprising a horizontally arranged interconnecting unit, comprising body side sills of a length extending to the frontal extremity of the body and having their fore and rear ends forming parts of final assembly joints, a cowl unit having ways formed on its lower margins complemental to the final assembly joint parts on the sills, and a rearmost unit formed with final assembly joint parts mating the formations on the rear ends of the sills.

12. A unit assembly construction for vehicle bodies comprising an independently assembled cowl unit embodying a front door post, an independently assembled rearmost unit embodying a rear door post and an independently assembled intermediate unit making final assembly joints with said cowl and rearmost units substantially in the transverse plane of said front and rear door posts, respectively, said intermediate unit embodying a body side sill provided forwardly and rearwardly with telescoping joint formations through which said final assembly joints are effected.

13. A unit assembly construction for vehicle bodies comprising a cowl unit embodying paneling and front door posts at the rear vertical edges of said paneling, a rearmost unit having door posts at the forward vertical edges thereof, each reinforced at the bottom by a bracket, and an intermediate unit embodying a body side sill having its forward portion in final assembly extended into the cowl unit and joined thereto through said door posts thereon and through complemental parts of said cowl unit and sill forwardly of said posts, and having its rear end terminating at said bracket and connected therewith.

14. A unit assembly construction for vehicle bodies comprising a cowl unit embodying door posts at its rear edges and a way at the bottom having converging sides toward the front of the cowl unit, a rearmost unit having door posts at its forward edges reinforced at the bottom by brackets each having a horizontal portion at their bases, and an intermediate unit embodying a pair of longitudinally extending transversely connected body side sills, the outside faces of which converge toward the front, said sills, being in final assembly telescoped within the convergent way of the cowl unit and making final assembly joints therewith through said door posts and parts of the cowl unit forwardly of said posts, the rear ends of said sills overlapping and making final assembly joints with the horizontal base portions of said brackets on the rearmost units.

15. A body for automobiles comprising an intermediate unit, including a pair of longitudinally-extending body sills and means connecting the sills and constituting therewith an independent unitary assembly, a cowl unit embodying door posts at its rear edges, which door posts have their lower portions formed to provide, with the lower side edges of the cowl, ways adapted to receive telescopically the forward ends of said sills; and a tonneau unit including a tonneau panel, curved to form the sides and back of a rear seat, and having an inwardly-extending flange at its lower edge, and a tonneau frame rigidly connected to said flange the forward corners of said frame being rigidly connected to the rear ends of the body sills to join the tonneau unit to the intermediate unit assembly.

16. In a vehicle body, the combination with a base unit and tonneau and cowl units for engaging the same, of an intermediate unit forming a front seat, said unit having post sections, and threshold sections projecting oppositely therefrom, and said threshold sections being channel-shaped for embracing the edges of said base unit and complementary to portions of said tonneau and cowl units.

17. In a vehicle body, the combination with a base unit, and tonneau and cowl units engageable with the opposite ends thereof, of an intermediate unit constituting a front seat, said unit being provided with posts which are intermediate the front and rear door openings, and threshold portions projecting oppositely from said posts and complementary to portions of said cowl and tonneau units, said intermediate unit being engageable with said base unit by an endwise movement and being rigidly secured thereto.

18. In a vehicle body, the combination with a base unit, and tonneau and cowl units engageable with the opposite ends thereof, of an intermediate unit constituting a front seat, said unit being provided with post sections integral with the opposite sides thereof, threshold sections merging into said post sections and projecting oppositely therefrom, said threshold sections being of channel cross section to embrace the opposite sides of said base unit, and reinforcements for said post sections flanged at their lower ends and secured to said base unit.

19. In a vehicle body, the combination with a base unit, and tonneau and cowl units secured to opposite ends thereof, of an intermediate unit constituting a front seat, said unit comprising a seat portion, a back portion, post portions projecting from opposite sides of said seat back portion, and threshold portions merging into said post portions and extending oppositely therefrom, said threshold portion being of channel cross-section for embracing the opposite sides of said base unit and being complementary to portions of said tonneau and cowl units.

20. A unit assembly construction for automobile bodies comprising an endmost unitary sub-assembly terminating substantially in the transverse plane of the endmost door posts and flanged at the bottom and including means cooperating with each of said flanges to provide an angular seat adapted to receive in nested relation therewith the projected end of an adjoining unit, whereby to make a longitudinally extending final assembly joint therewith.

21. A unitary cowl sub-assembly unit adapted to enter a sectional automobile body structure comprising a cowl body panel having inwardly extending horizontal flanges at the lower edges of said panel, said panel terminating at its rear ends in inwardly extending vertical flanges, and door posts secured to said vertical flanges having base portions separated by an open space from said horizontal flanges whereby to effect a way for the reception of forwardly extending portions of the next adjoining unit.

22. A cowl unit assembly for sheet metal automobile bodies comprising a cowl panel shaped to from the forward portion of the body, a shroud pan secured to the forward edge of said panel and a pair of rearwardly inclined toe-board supports rigidly secured to the rear face of said shroud pan, said toe-board supports having the rear ends thereof freely disposed with respect to said cowl panel to provide a way between said supports and panel for receiving a portion of an adjoining unitary assembly.

23. A cowl unit assembly for sheet metal automobile bodies comprising a cowl panel curved to form the forward portion of the body shell, said cowl panel being provided with inwardly extending flanges at its bottom sides, a shroud pan secured to the forward edge of said cowl panel, and a pair of rearwardly inclined toe-board supports rigidly secured to the rear face of said shroud pan, said toe-board supports having the lower ends thereof disposed above and spaced from said inwardly extending flanges.

24. A unitary sub-assembly for four door automobile bodies comprising a side panel adapted to form the outside of the body between door openings and having forward and rearward threshold extensions at its lower portion of a length substantially equal to the width of the door openings, and making final assembly joints with adjoining units substantially in the planes of the endmost door posts.

25. A horizontally arranged interconnecting unit adapted to enter a sectional automobile body construction comprising interconnected side sills of a length extending to the frontal extremity of the body and having their fore ends form parts of final assembly joints and parts of final assembly joints at the rear ends of said sills.

26. A unitary central sub-assembly for four door automobile bodies comprising body side sills and an intermediate door post structure erected on each of said sills in sub-assembly between door openings, said sills having their front and rear portions beyond said door post structure convergent and divergent with respect to the center line of the body and extended at least the full width of the thresholds of the doors and formed as complemental parts of final assembly joints.

27. An independently assembled front seat unit for four door automobile bodies comprising a sheet metal panel curved to form the sides and back of a front seat, a pair of side panels rigidly secured to the forward vertical edges of the front seat panel, each of said side panels including a forwardly and rearwardly extending threshold section, and a pair of longitudinally extending body sills rigidly connected to the lower portion of said side panel and threshold sections and extending forwardly in final assembly beyond the forward edge of the front door opening and rearwardly to the rear edge of the rear door opening.

28. In a vehicle body, an independently assembled seat unit comprising a seat back and seat sides and a seat proper and integral forward and rearward threshold members forming extensions from said unit.

29. In a vehicle body, an independently assembled unit comprising the back and sides of a seat and seat proper, door posts engaged with each side of said unit and threshold members integrally projecting from said door posts.

30. A tonneau unit for sheet metal automobile bodies comprising a tonneau panel curved to form the sides and back of a rear seat, a tonneau reinforcing frame rigidly secured to the lower portions of said tonneau panel, and reinforcing brackets rigidly connected at the forward corners of said frame and to the forward vertical edge portions of said tonneau panel, said parts together forming an independent unitary assembly.

31. In an automobile body structure, a side section and a tonneau joint member comprising a body, a portion of which forms a continuation of the tonneau wheel housing and an adjoining portion of which forms a continuation of the rear door post, in combination, with an inwardly extending bottom flange.

32. In an automobile body, a cowl unit assembly including a panel and a pair of door posts to which said panel is secured at its rear vertical portions, and an instrument board attached at its ends to said door posts.

33. A cowl unit for sheet metal automobile bodies comprising a cowl panel shaped to form the forward portion of the body, a shroud pan rigidly secured to the forward edge of the cowl panel, a pair of door posts rigidly secured to the rear vertical portions of the cowl panel, and an instrument board rigidly connected to said door posts and the rear horizontal portion of the cowl panel.

34. In an automobile body, the combination of a pair of body sills, a cowl panel rigidly mounted thereon, a pair of door posts rigidly secured to the rear vertical portions of said cowl panel, said door posts being provided with inwardly-extending flanges at their upper ends, and an instrument board secured to said flanges.

35. In an automobile body, the combination of a pair of body sills, a cowl panel mounted thereon, a pair of door posts secured to the rear vertical portions of the cowl panel, the upper portion of each door post being provided with a flange extending inwardly towards the center line of the body, said flange being rigidly secured to the cowl panel, and an instrument board secured to said flange and the horizontal portion of the cowl panel.

36. In an automobile body, the combination with a cowl panel, of a door post secured thereto and having an integral flange extending from the upper end thereof, and an instrument board connected to said flange.

37. In an automobile body, the combination of a pair of body sills, a cowl panel mounted thereon, a pair of door posts secured to the rear vertical edge portions of the cowl panel, each door post being provided with a widened flange extending inwardly toward the center of the body, said flange being rigidly secured to a transversely extending portion of the cowl panel at the rear top edge thereof.

38. In an automobile body structure, a heel board having a vertical wall constituting the heel board proper, and an integral forward extension constituting a part of the body floor.

39. In an automobile body structure, a heel board having a vertical wall constituting the heel board proper, and an integral forward extension constituting a part of the body floor, together with means transversely supporting the forward edge of said extension.

40. In an automobile body structure, side sills having a kick-up portion, a heel board having a vertical wall located on the kick-up portion, and an integral forward and downward extension from said heel board constituting the floor of the body transversely of the kick-up portion of the sills.

41. In an automobile body, the combination of a tonneau panel curved to form the sides and back of a rear seat, a tonneau reinforcing frame rigidly secured to the lower portion of said panel, and a sheet metal stamping secured to said frame and having a vertical portion forming a heel board for the rear seat and a substantially horizontal portion forming a part of the tonneau floor.

42. In an automobile body, the combination with a tonneau panel curved to form the sides and back of a rear seat, of a rod connected to the sides of said tonneau panel and extending across the tonneau, and a vertical plate forming the heel-board for said rear seat and having its upper edge connected to said rod.

43. In an automobile body, the combination with a tonneau panel curved to form the sides and back of a rear seat, of a rod connected to the sides of said tonneau panel and extending across the tonneau, and a plate, forming the heel-board for the rear seat and having portions, at its upper edge, bent around said rod..

44. In a body structure for automobiles, spaced longitudinal sills, a cross-connecting member, and a transversely supported seat pan, the rear edge of which is secured to said cross-connecting member substantially in the lowermost plane of said sills.

45. In a body structure for automobiles, a tonneau panel curved to form the rear portion of the body shell, and a transversely supported seat pan therein, the rear edge of which is supported substantially in the plane of the lower rear edge of the tonneau panel.

46. In a body structure for automobiles, a tonneau panel curved to form the rear portion of the body shell, a pair of metallic angle members forming sills to which the lower portions of said tonneau panel are rigidly secured, said angle members having horizontal flanges at their lower edges, and a seat pan carried by and rigidly secured to said horizontal flanges.

47. In a body structure for automobiles, a tonneau panel curved to form the rear portion of the body shell, a pair of metallic angle members forming sills to which the lower portions of said tonneau panel are rigidly secured, said angle members having horizontal flanges at their lower edges, a heel board panel supported by and rigidly secured to said horizontal flanges, and a seat pan supported by said heel board panel.

48. In a body structure for automobiles, a tonneau panel curved to form the rear portion of the body shell, a plurality of metallic angle members forming sills and a rear cross member to which the lower portions of said tonneau panel are rigidly secured, said angle members having horizontal flanges at their lower edges, a heel board panel supported by and rigidly secured to the horizontal flanges of said sills, and a seat pan supported by said heel board panel, said seat pan sloping rearwardly and having its rear end resting on and secured to the horizontal flange of said rear cross member.

49. A unit assembly construction for automobile bodies comprising a cowl unit embodying a cowl panel and attached front door posts, and an independently assembled adjoining unit embodying a door sill member joined to said cowl unit in substantially the plane of said door post and having a frontal extension housed entirely within the body of said cowl unit in front of the rear face of said door posts.

50. In a body structure for automobiles, a tonneau panel curved to form the rear portion of the body shell, metallic angle members forming sills and a rear cross member to which the lower portions of said tonneau panel are rigidly secured, said angle members having horizontal flanges at their lower edges, a heel board panel resting on and secured to the horizontal flanges of said sills, the lower portion of said heel board panel extending forwardly forming a part of the floor of the tonneau, and a seat pan having its forward edge supported by said heel board panel and its rear edge seating on and secured to the horizontal flange of said rear cross member.

51. In a body structure for automobiles, the combination of a pair of metallic angle sills disposed at opposite sides of the body and extending longitudinally thereof, each of said sills having a vertically extending branch, a supporting member secured to each of said vertical branches of the sills, and provided with a rearwardly inclined upper edge, and a seat pan supported at the sides on the rearwardly inclined upper edges of said supporting members.

In testimony whereof, I affix my signature.

JOSEPH LEDWINKA.